Dec. 19, 1922.

C. E. COCHRAN.
LOAD SECURING MEANS FOR INDUSTRIAL TRUCKS.
FILED AUG. 19, 1921.

1,439,227.

INVENTOR
Clyde E. Cochran
BY Bates & Macklin
ATTORNEYS

Patented Dec. 19, 1922.

1,439,227

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

LOAD-SECURING MEANS FOR INDUSTRIAL TRUCKS.

Application filed August 19, 1921. Serial No. 493,701.

*To all whom it may concern:*

Be it known that I, CLYDE E. COCHRAN, a citizen of the United States, residing at Cleveland, in the county of Cuyahoga and State of Ohio, have invented a certain new and useful Improvement in Load-Securing Means for Industrial Trucks, of which the following is a full, clear, and exact description, reference being had to the accompanying drawings.

This invention relates to industrial trucks, wherein the truck is provided with mechanism for raising, transporting and depositing articles.

In my application for Letters Patent on an industrial truck, filed July 9, 1920, Serial No. 394,933, I have shown and described load supporting means positioned on the end of a truck which is particularly adapted for the handling of paper rolls. This mechanism includes a load handling scoop rotatably mounted on a boom pivotally secured to one end of the truck. A conventional illustration of means for securing the load to the load handling scoop was illustrated which was comprised substantially of a pair of annular members secured to the scoop and an arcuate metallic strap slidably mounted therebetween. Such load securing mechanism, while operable is impractical, for the reason that it was necessary for the operator to leave his position on the truck when shifting this load securing means.

The general object of this invention, therefore, is to provide means in an industrial truck of the type referred to, which will prevent a body from being displaced while it is being loaded for transporting, and which may be brought into engagement with the load by the operator from his position on the truck.

A more specific object is the provision of means for securing the load to the load handling means and which may be carried by the truck independent of the load handling means.

A more specific object is the provision of a load securing member adapted to co-operate with the load handling means and which may be adjustable longitudinally or transversely of the load handling means.

Figure 1:
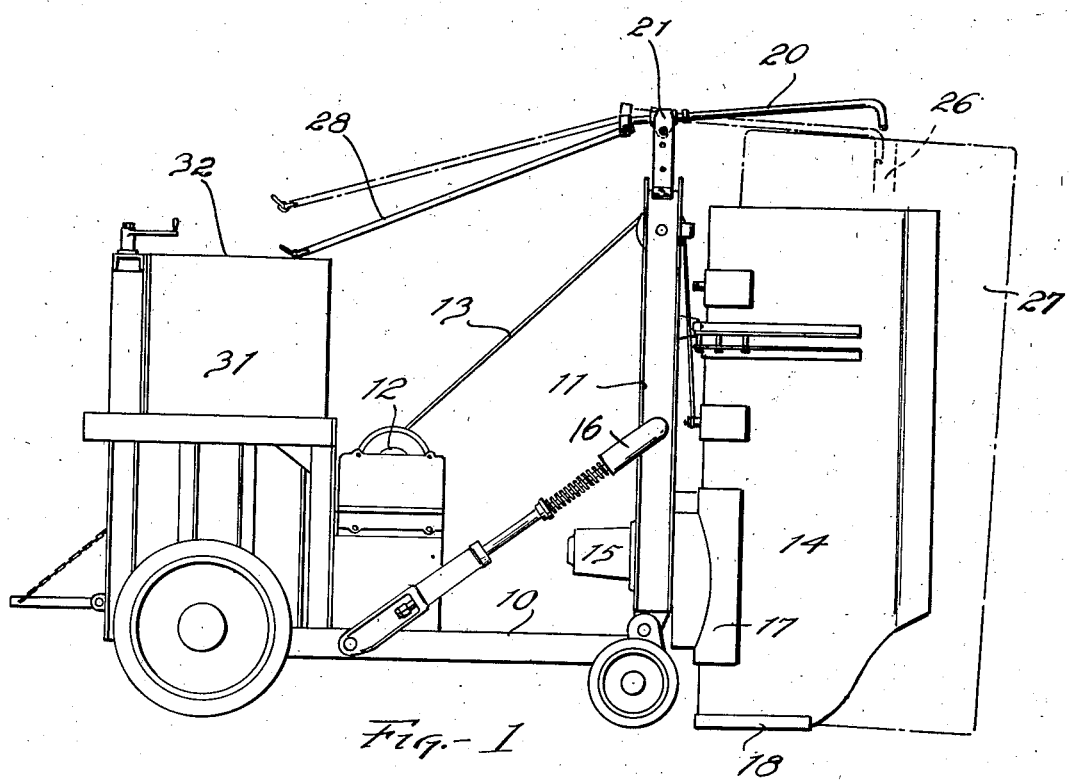
Figure 2:
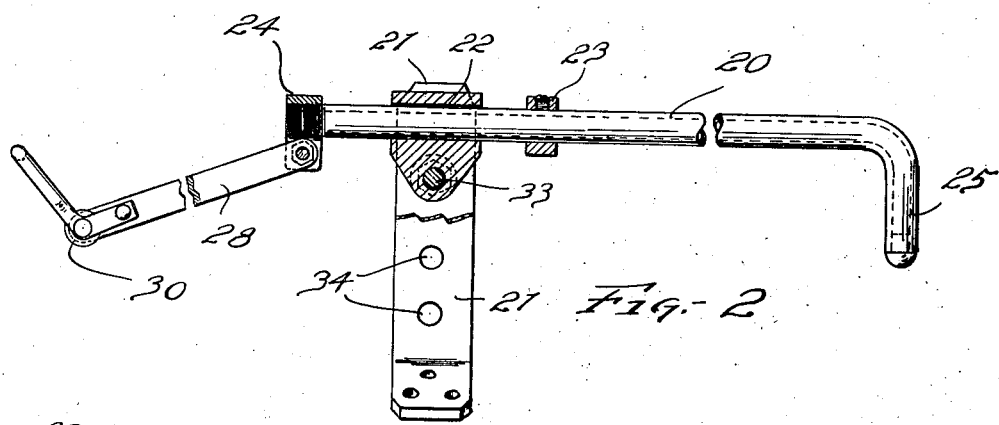
Figure 3:
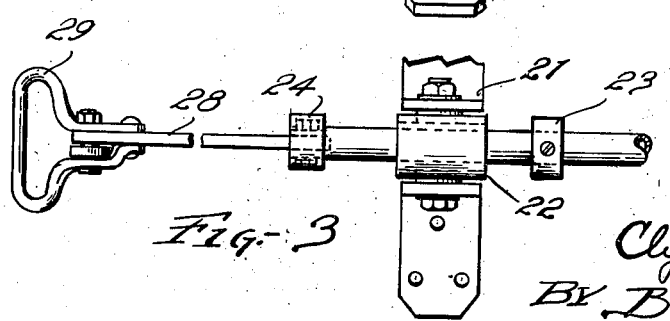

These and other objects will be apparent in the following description taken in connection with the accompanying drawings, wherein Fig. 1 is a side elevation of an industrial truck such as I have described with an embodiment of my invention associated therewith. Fig. 2 is an enlarged sectional elevation of the load securing means and Fig. 3 is a fragmentary plan view of the same device.

In the drawings, I have illustrated an industrial truck having load handling means particularly adapted for the handling of large paper rolls, comprised substantially of a frame 10, and a boom 11, pivotally secured to the end thereof, and boom actuating means 12, consisting of a winding mechanism and a flexible member 13. The end of the flexible member, or cable, may be secured to a load supporting apron 14, a sufficient distance from the axis of a pivot mounting 15 secured on the boom to effect a turning movement of the apron.

When the winding mechanism draws in on the cable, the boom, apron and load will be tilted to an inclined transportable position over the truck. While the boom is in the tilted position, the apron and load may be swung to a horizontal position about the pivot 15, upon a slackening of the cable by the winding mechanism. A suitable telescopic member 16 serves to limit the inward and outward swing of the boom.

The load supporting apron 14 may be comprised of a semi-circular metallic sheet rigidly secured to a pivot member 17, which is associated with the pivot bearing 15. A projecting portion 18 may be arranged to lie in a horizontal position on the ground or floor when the load carrying apron is in a substantially vertical position. As the truck approaches the load, this projecting portion will be forced thereunder by the truck.

My invention, however, is primarily concerned with the provision of means for engaging the top of a load and retaining it on the projecting portion 18 and body portion 14, when the boom and load are tilted inwardly over the truck.

To effect this result, I have provided an arm 20, pivotally mounted on a support 21 secured to the top of the boom. A bearing block 22 pivotally mounted on the support members 21, serves as a thrust member when the collars 23 and 24 secured to the member 20 are in abutting relation therewith, the arm 20 being slidably mounted on this member. Any convenient means such as a removable bolt 33 may serve as a pivot for the block 22. A downwardly extending portion 25 is adapted to be inserted in the core cavity 26 of the paper roll 27 by means of a control lever 28 in hinged relation with the thrust collar 24 and extending rearwardly to the driver's position on the truck. This lever may have a suitable handle 29 secured thereto and a roller member 30 positioned at the end thereof, which is adapted to roll on the upper surface 32 of the battery casing 31.

As the boom and the load are tilted inwardly the end of the control lever 28 will move along the surface of the battery casing 31. During this tilting movement, the arm 20 is maintained in a fixed position relative to the boom, due to the stress exerted thereon by the load when being tilted. Consequently, the angular relation of the hinged control lever 28 and the load securing member 20 is constantly changed as the boom is tilted inwardly.

In order to adjust the control lever 28 into its original position with relation to the arm 20, it is necessary that the operator adjust the lever downwardly when it is free from the battery casing during the unloading operation and while the arm 20 is still engaged with the load. This may be conveniently accomplished during the final movement of the boom into the vertical unloading position.

Sufficient looseness may be provided between the member 20 and the pivot pin 33 and also between the sliding member 20 and the member 22 to permit a sufficient annular movement of the control lever and the arm 20 to engage a roll which might not be exactly positioned on the apron 14 during the loading operation. The thrust collar 24 and the thrust collar 23 may likewise be positioned a sufficient distance apart to permit the operator to shift the arm slightly toward and away from his position on the truck when engaging the load. As the boom is tilted inwardly, however, the member 20 when coming into engagement with the load will remain stationary until the member 24 abuts the member 22 after which the load will be drawn into a tilted position on the truck by the apron 14 and the arm.

If it is desired to adjust the arm longitudinally of the load the pivot bolt 33 may be withdrawn and the block 22 positioned higher or lower by inserting the pin in any one of the openings 34 formed in the supporting members 21.

I have thus provided an adjustable load securing means of extreme simplicity and very economical construction, which may be readily manipulated by the operator from his position on the truck.

I claim:

1. The combination in a truck, of a boom, a load-lifting member pivoted thereto and adapted to swing from a vertical to a horizontal position, said load lifting member comprising a body engaging portion and an end engaging portion rigidly secured to the bottom thereof and a second load engaging member carried by the boom and co-operating with the first named load engaging member to secure a load on the truck.

2. The combination with a truck, of a boom, a load lifting member pivotally secured thereto and adapted to swing from a vertical to a horizontal position, the load lifting member having a body engaging portion and an end engaging portion and a load engaging member carried by the boom and arranged to co-operate with said load lifting member, the last named member being movable from the driver's position on the truck.

3. The combination of a truck, a boom connected therewith, means movable with said boom for engaging the side and bottom of a load, and means carried by the boom, and co-operating with the first named means for maintaining the load in engagement therewith.

4. The combination in a truck adapted to carry a roll of paper, of a pivotally mounted boom, a load supporting member on the boom adapted to swing from a substantially vertical to a horizontal position, and means for engaging the top and bottom of a roll of paper including a bottom projecting portion rigid with the swinging member and an adjustable member secured to the boom adapted to enter the core opening of the paper roll and thereby retain the roll on the truck when the roll is elevated by said swinging member.

5. The combination of a truck, a boom, a load engaging member pivotally mounted thereon and adapted to engage the bottom and side of a load, said member being tiltable from a vertical to an inclined position, and adjustable means for engaging the other end of the load comprising an extensible member pivotally mounted on the boom and adapted to be shifted into engagement with the upper part of the load by a control lever extending to the operator's position on the truck.

6. The combination of an industrial truck, a tiltable apron mounted on a boom pivotally secured to the truck, a projection on said apron adapted to be positioned beneath the load to be transported and adjustable means positioned on the boom and above said apron, comprising an arm pivotally mounted on a support carried by the boom and adjustable lengthwise of the apron and an operator's control member associated with the arm for manipulating the arm into and out of engagement with the load carried by said apron.

In testimony whereof, I hereunto affix my signature.

CLYDE E. COCHRAN.